M. C. POWELL.
KITCHEN CABINET.
APPLICATION FILED DEC. 16, 1911.
1,032,861.
Patented July 16, 1912.
2 SHEETS—SHEET 1.
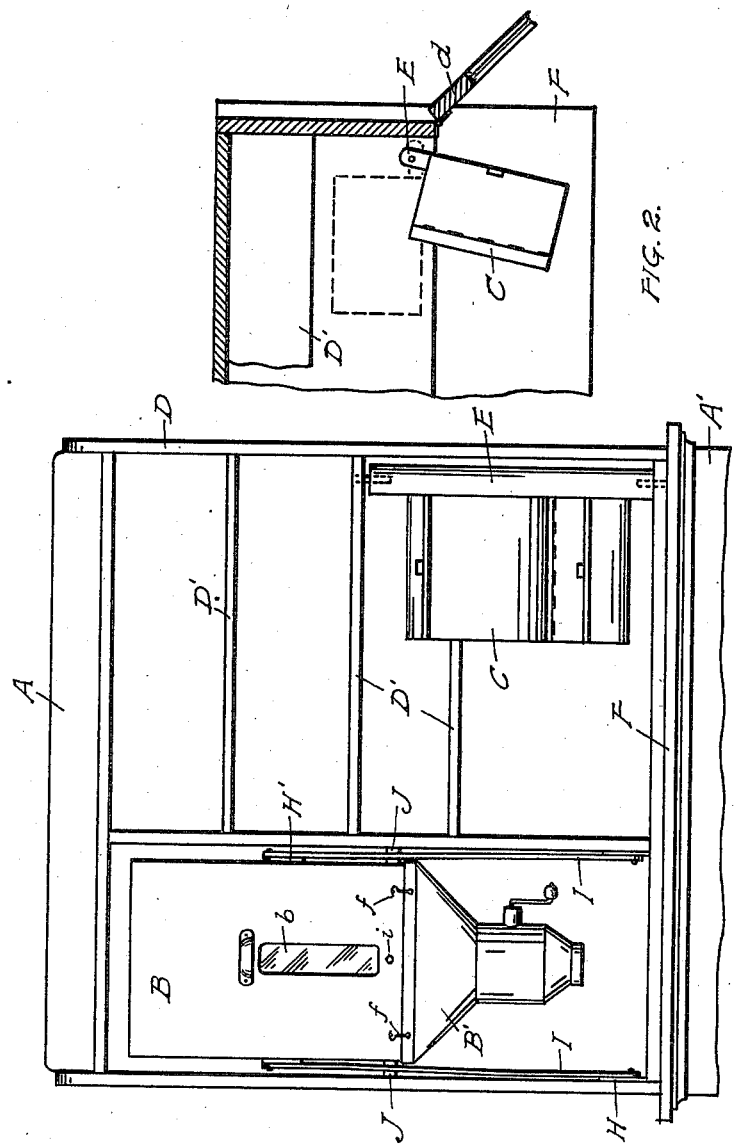
WITNESSES:
INVENTOR:
Milton C. Powell
BY
ATTORNEY.

M. C. POWELL.
KITCHEN CABINET.
APPLICATION FILED DEC. 16, 1911.
1,032,861.
Patented July 16, 1912.
2 SHEETS—SHEET 2.
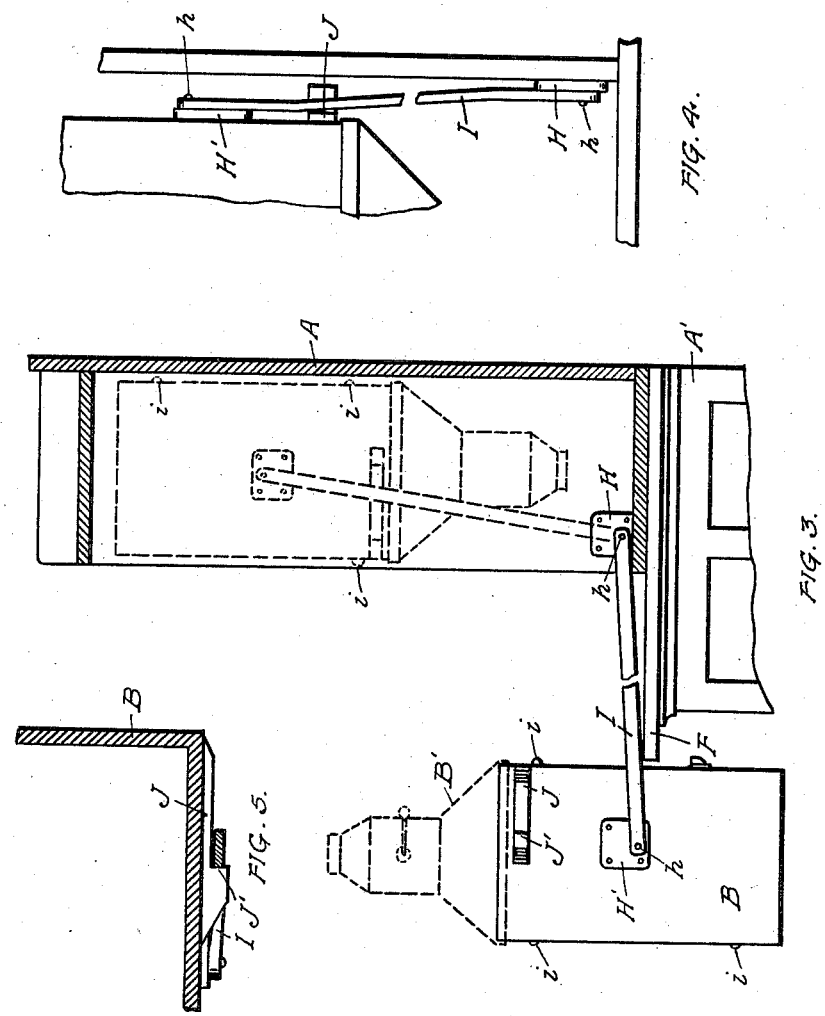
WITNESSES:
INVENTOR:
Milton C. Powell
BY
Eugene Ayres,
ATTORNEY.

UNITED STATES PATENT OFFICE.

MILTON C. POWELL, OF ST. JOSEPH, MISSOURI.

KITCHEN-CABINET.

1,032,861.  Specification of Letters Patent.  Patented July 16, 1912.

Application filed December 16, 1911. Serial No. 666,199.

*To all whom it may concern:*

Be it known that I, MILTON C. POWELL, a citizen of the United States of America, residing at the city of St. Joseph, in the county of Buchanan and State of Missouri, have invented certain new and useful Improvements in Kitchen-Cabinets, of which the following is a specification.

My invention relates to an improved mechanism in kitchen cabinets by which the filling of receptacles for sugar and flour is facilitated by rotating the former forward outside the cabinet and over the front part of the supporting table or case and by rotating the latter forward, over, and partly below the horizontal plane of the table top.

I accomplish my object by the mechanism illustrated in the accompanying drawings in which—

Figure 1 is a front view of the interior of the cabinet showing two compartments, shelving, and flour and sugar bins with their adjusting mechanism; Fig. 2 is a top view of the sugar bin revolved forward of its compartment over the cabinet table; Fig. 3 is a cross section of the cabinet, the bottom of the supporting member shown broken away, said figure showing the flour bin lowered to a position in front of the cabinet table, the hopper portion removed to permit the bin to be filled, the dotted lines within the cabinet showing the position the bin, hopper and supporting arms occupy when the bin is in the cabinet in its normal position; Fig. 4 is an enlarged view of one of the arms that support and rotate said flour bin in and out of the cabinet, and Fig. 5 is an enlarged detail of one of the beveled stops fastened to the sides of the flour bin.

Similar letters refer to similar parts in the several views, the body of the cabinet being indicated by the letter A, the receptacle for storage of flour by the letter B and the sugar bin by the letter C.

As shown in Fig. 1 a separate compartment D is provided for the sugar receptacle having shelves D' D'—. . .—for spices and other culinary articles. The door $d$ of said separate compartment is shown in Fig. 2 swung open. A post E is set pivotally just inside the compartment next the hinged edge of said door. Said sugar receptacle is supported by said post and as shown in Fig. 2 may be swung out of the cabinet over the top of table F of the cabinet supporting mechanism A'. When the sugar bin is thus rotated forward, it is in filling position.

As illustrated in Fig. 1 the flour bin B is provided with a glazed window $b$ through which it may be seen when refilling is necessary. The bottom of said bin is provided with a detachable combined closure and hopper B' having hooks $f$ $f$—. . .—or similar means for holding the same tight to that part of said bin which is its bottom when in normal position. The normal position of said flour bin filled and in use is that shown in Fig. 1 and by dotted lines in Fig. 3; the position it occupies when rotated to a filling position, as shown in front of table F in Fig. 3, is precisely the reverse of that shown in Fig. 1 and by dotted lines in Fig. 3. To support said flour bin and hopper, the base of each side of the compartment which houses the same is provided at its front, as illustrated in Fig. 3, with a metal plate H and each side of the flour bin, approximately near the center, is provided with a similar plate H', each of said plates having integral therewith a bolt $h$ serving as a pivot. Metal arms I I are pivotally connected at both ends with said plates and bolts, and support the bin and hopper in normal position. Said arms when supporting the bin in its compartment in the cabinet bear rearwardly from bottom to top, as shown by dotted lines in Fig. 3, thereby supporting the bin in a position in which, by reason of gravity, it will not tip forward out of its housing or compartment. $i$ $i$—. . .—are rubber or leather buttons on the front and rear of the flour bin which hold the bin slightly spaced from the back of the cabinet and prevent the bin from marring either the cabinet or the top of the table when the bin is lowered. As shown in Fig. 4 said arms I I are bent slightly inward from bottom to top thereby bearing at their upper ends toward each other and against opposite sides of said bin preventing the swaying of the bin from side to side. J J are bevel guides and J' J' stops to aid in steadying said bin and carrying and holding said arms in position. The normal top of said bin is always closed being made integral with the bin thereby preventing the entrance of dust and contributing to the sanitary value of the device. It will be seen that the only opening into the bin is at the bottom, said hopper serving the dual purpose of a removable lid to permit the emptying of flour into the bin and a sifter for discharging the flour therefrom. Said opening in the bin is the full size of the bin thereby permitting the bin to be thoroughly cleansed.

To permit the bin to be filled with flour it is only necessary to draw it forward from the position shown by dotted lines in Fig. 3 until the supporting arms I I slope slightly forward instead of rearward; then the bin is pulled forward and downward in the arc of a circle; in descending the front of the hopper end of the bin will first lodge on table F; a slight downward pressure will then throw the bin in front of and partly below the horizontal line of said table, as shown in Fig. 3. The combined lid and hopper are then unhooked and lifted off the bin, a sack of flour on the table tipped over to and emptied therein. The combined closure and hopper are then replaced on the bin, the bin is lifted, its hopper end tipped back to the cabinet, then raised toward its normal position and rotated back into the cabinet with only a minimum of effort, arms I I relieving the operator of the greater part of the weight guiding the bin into the cabinet, the beveled stops in the same assisting, and rubber buttons $i$ $i$ preventing the finish of the parts being marred.

What I claim and desire to secure by Letters Patent is,—

The combination in a kitchen cabinet of two compartments, a supporting table member thereunder projecting forward, a pivoted post in one compartment, a sugar bin rigidly attached thereto revoluble over said table, a combined flour bin and hopper beneath, in the other of said compartments, beveled guides, stops and buttons connected therewith, metal duplicate arms at the sides thereof, bearing rearwardly from bottom to top, said arms being adapted to carry said bin and hopper out of said cabinet and guide said bin to a reversed position in front of and partly below said table member and to assist in the return thereof to its normal position.

In testimony whereof I affix my signature in presence of two witnesses.

MILTON C. POWELL.

Witnesses:
J. REARDON,
LOUIE COMBS.

---

Copies of this patent may be obtained for five cents each, by addressing the "Commissioner of Patents, Washington, D. C."